UNITED STATES PATENT OFFICE.

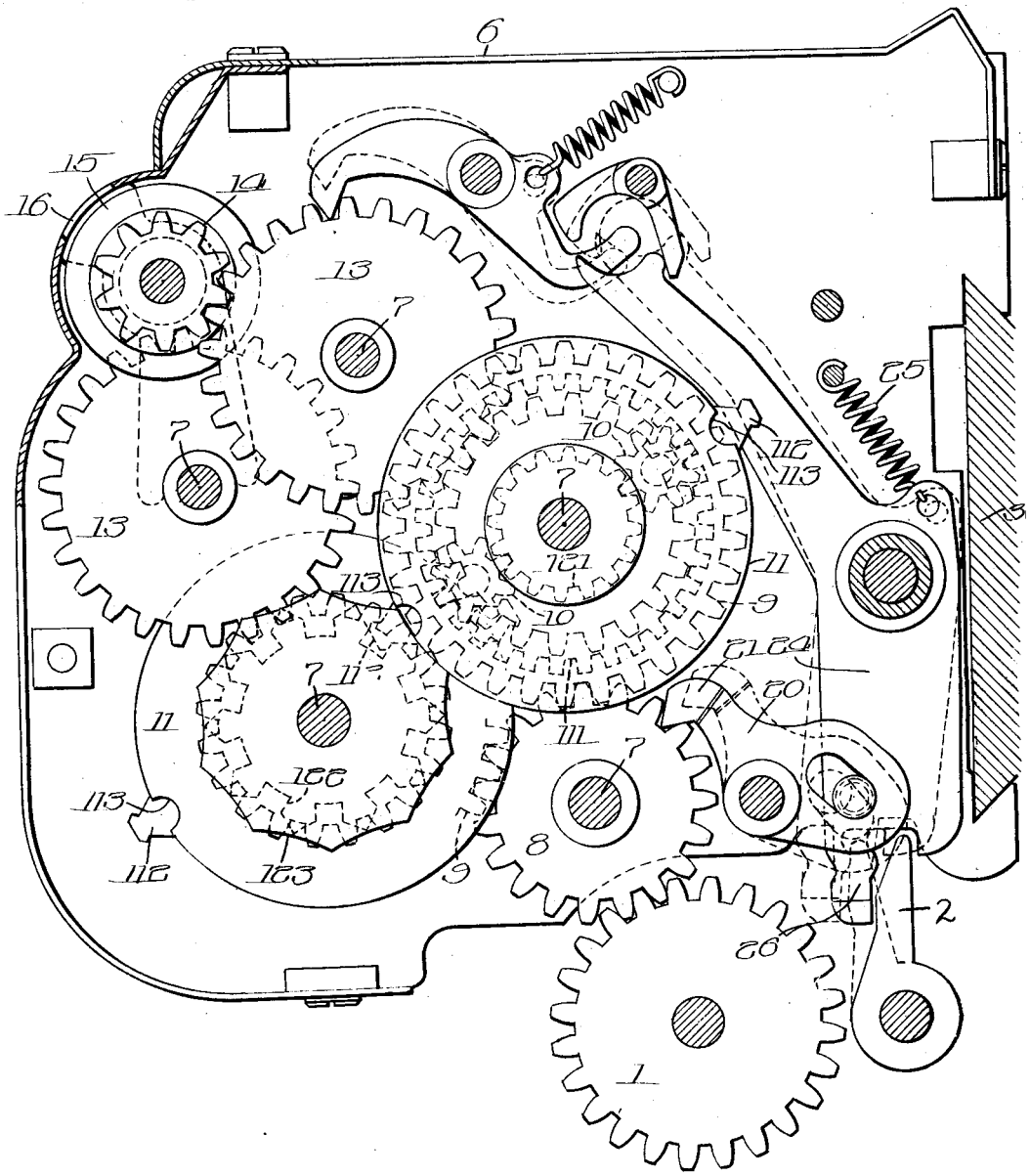

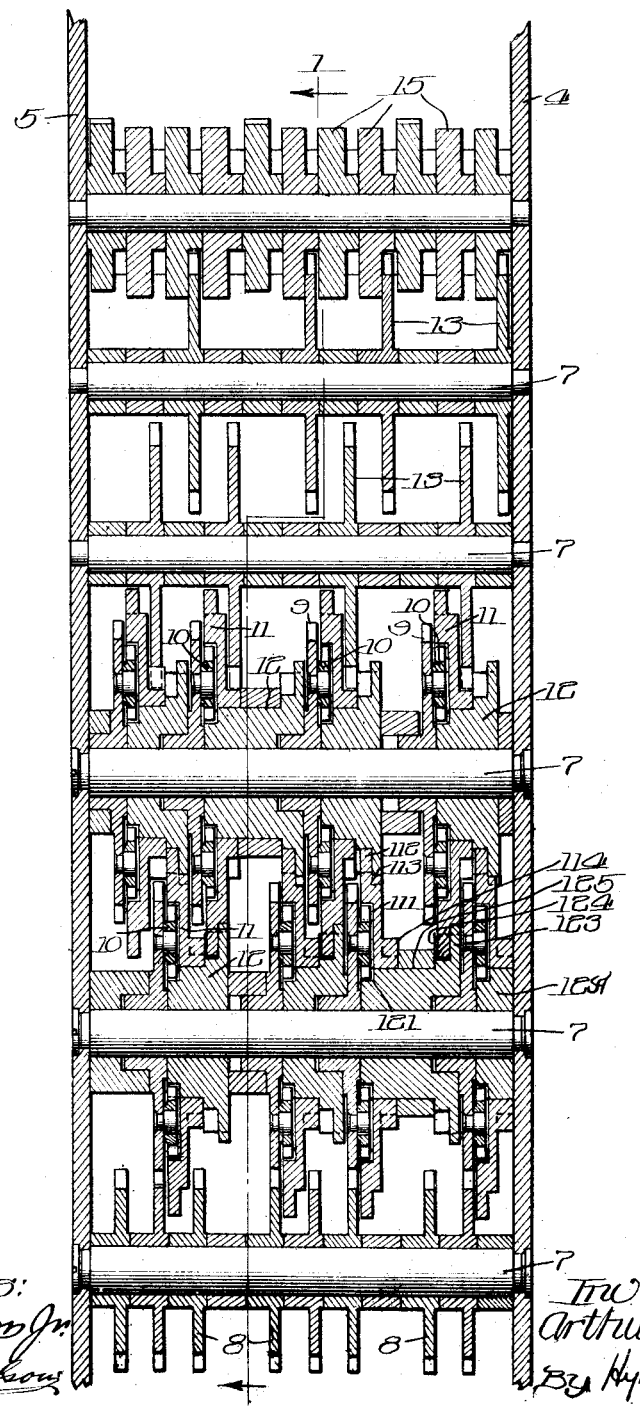

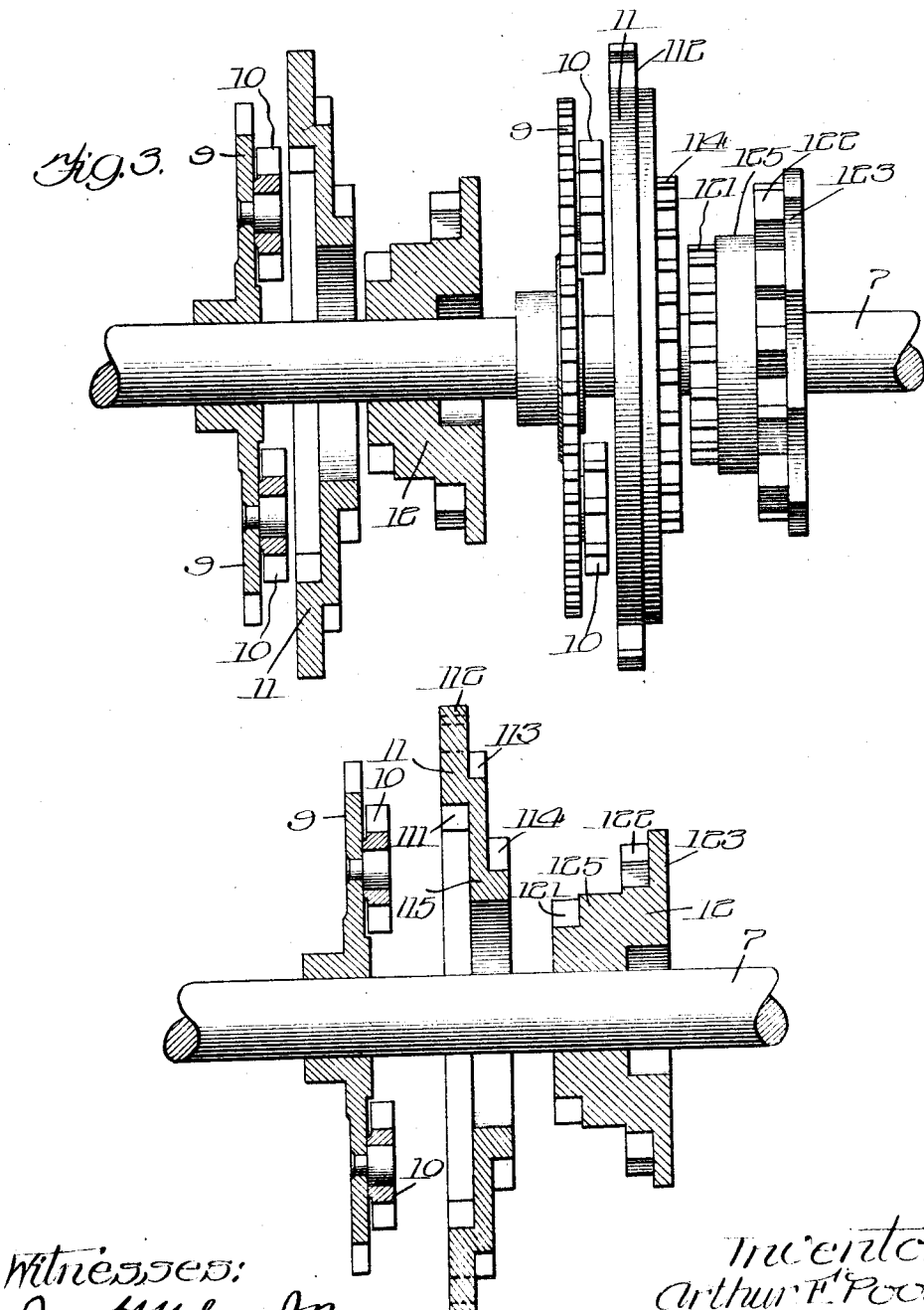

ARTHUR F. POOLE, OF CHICAGO, ILLINOIS, ASSIGNOR, BY MESNE ASSIGNMENTS, TO WAHL ADDING MACHINE COMPANY, OF WILMINGTON, DELAWARE, A CORPORATION OF DELAWARE.

CALCULATING-MACHINE.

1,085,757.      Specification of Letters Patent.      Patented Feb. 3, 1914.

Application filed April 27, 1912. Serial No. 693,736.

*To all whom it may concern:*

Be it known that I, ARTHUR F. POOLE, a citizen of the United States, residing at Chicago, in the county of Cook and State of Illinois, have invented certain new and useful Improvements in Calculating-Machines, of which the following is a specification.

This invention is a new totalizer to be used in connection with calculating machines, whether the same be simply adding and subtracting, or multiplying and dividing machines.

While the totalizer may be used in connection with any calculating machine, for the purposes of this explanation, it is imagined to be mounted upon a totalizer holding bar, and to coöperate with a master mechanism such as shown in Patent No. 893,719, issued July 21, 1908, to John C. Wahl and now on the market in connection with the Remington typewriter.

The invention is illustrated by the accompanying drawings, of which—

Figure 1 shows a sectional elevation of the totalizer, looking from the right side. Fig. 2 shows a development of the wheels of the totalizer, and Fig. 3 shows the carrying and accumulating wheels of the totalizer drawn to a larger scale and separated from each other in order to more readily show their construction.

For the explanation of this invention, it is sufficient to recall that in the master mechanism of the above cited patent, there are present a master wheel 1, and a master dog 2, the numerals 1 and 2 referring to similar parts shown in the present application. Both the master wheel and master dog are, by proper intermediate mechanism, connected to and operated by the numeral keys of the typewriter. The operating of any of the set of numeral keys causes first, the rotation of the master dog about its fulcrum in a direction to advance its upper end toward the front (the left, as viewed in Fig. 1); second, the rotating of the master wheel 1 about its fulcrum or axis an amount dependent upon the numerical value of the numeral key operated, and in a direction dependent upon whether the machine is adding or subtracting; and third, the retracting of the master dog to its first position. Attention is called to the fact that the movement of the master dog both precedes and succeeds the rotating of the master wheel, there being no over-lapping of the motions of the master wheel and master dog, temporally, or in point of time. The movements of the master wheel and master dog occur on the down stroke of the keys. During this time, the totalizer holding bar 3 remains stationary. Upon the up-stroke or restroke of the numeral key, both the master wheel and master dog remain stationary, but the totalizer holding bar advances one step to the left. Therefore, so does the totalizer mounted thereon.

The totalizer has a right side wall 4, a left side wall 5, a cover 6, and a number of shafts 7, extending between the right and left walls. These shafts serve not only to brace and support the two walls, but also as axles upon which are rotatably mounted the various wheels and levers forming part of the totalizer.

The master wheel 1 is adapted to mesh *seriatim* with a set of digit receiving wheels 8, rotatably mounted upon one of the shafts 7. Each of the digit receiving wheels 8 is in mesh with an accumulating wheel 9. There are thus as many accumulating wheels 9 as there are digit receiving wheels 8. But the accumulating wheels are not all mounted upon the same shaft. Instead, they are mounted upon two shafts, and each alternate accumulating wheel is mounted upon the other shaft.

Epicyclically and rotatably mounted upon each accumulating wheel 9 are two pinions 10. The reason why two epicyclic pinions are used instead of one is simply a matter of convenience, and not of theory. Each epicyclic pinion is in mesh with a spur gear 121 forming a part of a carried wheel 12, and also with an annular gear 111 forming a part of the carrying gear 11.

Each carrying wheel 11, besides the teeth 111 above mentioned, is provided on its outside with two carrying teeth 112, a locking disk 113, and a spur gear 114. To coöperate with the carrying tooth 112 and the locking disk 113, the carried wheel is provided with a carriable gear 122 and a lockable disk 123.

The construction of the carrying teeth 112, carriable gear 122, locking disk 113, and lockable disk 123 is old, well-known in the art, illustrated and thoroughly explained in many patents, and in general resembles the Geneva mechanism. It will therefore not be further entered into.

An examination of Fig. 3 will show that the carried wheel 12 is provided with a hollow at its right. This is simply a clearance space for the hub of the adjacent accumulating wheel. The carried wheel also has a portion 125 which is smooth and cylindrical. This serves as a bearing whereon is mounted a bearing 115, on the inside of the carrying wheel. The carrying wheel is thus supported so as to be freely rotatable.

It has been stated that the various carried wheels 12 are freely rotatable upon their supporting axles. This is generally true except for the carried wheel 12 at the extreme right of the series. This particular carried wheel is rigidly fastened to the right side wall and does not rotate.

The operation of the totalizer is as follows: Imagine the various accumulating wheels 9 to have, each of them, imparted thereto a rotation proportional to the value of the digit. Should that digit be zero, then the rotation of the corresponding accumulating wheel must also be zero—that is, that particular accumulating wheel must be held fast. The accumulating wheel in its rotation carries therewith the epicyclic pinions 10. These meshing with the internal teeth 111 of the carrying wheel upon the same shaft and immediately to the right, cause the rotation of the latter a proportionate amount. Whenever a carriage takes place, the carrying tooth 112 strikes upon the carriable gear 122 of the carried wheel upon the other shaft and rotates said carried wheel one step. Moreover, overthrow is prevented by the simultaneous engagement and subsequent disengagement of the locking disk 113 with the lockable disk 123. The carried wheel 121 is thus rotated one, and only one, step, and because of its engagement by means of its spur teeth 121 with the epicyclic pinions 10 upon the accumulating wheel 9 next to the right and upon the same shaft, there is imparted to the carrying wheel 11, also in engagement with the latter epicyclic pinions 10, a movement of one step. There may thus be imparted to the higher carrying wheel 11 a movement due to the digital rotation of the accumulating wheel 9 immediately to the left thereof, and also a rotation due to the carriage of the next lower carrying wheel 11. Moreover, these two rotations, impartable to the higher carrying wheel 11 may occur successively or simultaneously, on account of the epicyclic construction.

It is thus evident that whether all of the accumulating wheels are rotating in the same direction, or some in the opposite direction, or some stationary, the displacement of the carrying wheels 11 from their zero positions will always be exactly proportional to the sum of the movements thus far imparted to the accumulating wheels 9, carrying having already taken place in the proper manner. There remains only the exhibiting to the eye the value of the displacement of each carrying wheel 11 from its zero position. This is accomplished by providing a set of intermediate gears 13 which mesh with the spur gears 114, forming part of the carrying wheels 11, and these intermediate gears 13 in their turn mesh with gears 14 forming part of the numeral wheels 15. These numeral wheels bear on their periphery the figures 0, 1, 2, 3, etc., which are exposed at the exhibition slot 16 in the cover.

In the above explanation, it was pointed out that each accumulating wheel 9 must have a definite rotation imparted thereto, and if that rotation should be zero, the accumulating wheel must be positively held and prevented from rotating. This particular totalizer is intended for coöperating with a master wheel. The digits would therefore be entered into the totalizer one at a time, *seriatim*, and it is therefore necessary to hold all the accumulating wheels except the one which is in engagement with the master wheel. This is accomplished by providing a series of holding levers 20, one for each of the receiving wheels 8. Each holding lever is provided with a tooth 21 at its farther end which enters a space upon the gear 8 and prevents the latter from rotating. Each holding lever is also provided at its opposite end with an inclined slot 22 wherein is entered a pin 23 fastened in an arm 24. The arm 24 forms part of a lever rotatably mounted upon a supporting shaft and provided with a tension spring 25. Each arm has also extending therefrom at its front lower corner a finger 26 adapted to be pushed by the master dog 2. The operating of the numeral key therefore causes the finger 26 to be moved forward and its coöperating holding lever 20 to have its holding tooth 21 retracted from its digit receiving wheel 8. This particular digit receiving wheel is therefore free to rotate and is so rotated positively by the master wheel 1, which at that moment is in engagement therewith. All the other digit receiving wheels 8 are however locked by their holding levers for all the other arms 24 are in their normal position and kept so by their springs 25.

Having thus described my mechanism, I claim:

1. In a totalizer: a series of numeral wheels mounted on one shaft; a series of carrying wheels; a series of idler wheels intermediate between the carrying wheels and the numeral wheels; two shafts for said series of idler wheels, the consecutive idler wheels being arranged alternately upon the two shafts.

2. In a calculating machine totalizer: a series of numeral wheels; a shaft therefor; a series of idler wheels, one for each numeral wheel; two shafts therefor; a series of carrying wheels, one for each idler wheel, and two shafts for said series, each wheel being always in mesh with its numeral wheel, and the three together forming a set for each decimal place of the totalizer, the carrying wheel and idler wheel of one set being placed upon two of their four shafts, and the carrying wheel and idler wheel of the next set being placed upon the two other of their four shafts.

3. In a calculating machine totalizer: a series of accumulating wheels; two shafts for said accumulating wheels, the accumulating wheels being placed alternately upon the two shafts; a series of receiving wheels for said accumulating wheels, said receiving wheels being placed upon one shaft; and means for operating said receiving wheels.

4. In a totalizer: a series of sets of parts, one set for each decimal place of the totalizer, each set being composed of 1, an accumulating wheel, 2, a higher carrying wheel, 3, a lower carried wheel, and 4, epicyclic connection between the other three members of the set; a series of locking dogs, one for each accumulating wheel, and means for normally retaining each locking dog in its locking position, to thereby prevent the rotation of its engaged accumulating wheel; and mechanism for unlocking one of said dogs, while retaining the others in their locking positions.

5. In a calculating machine: a combination of a master wheel, a master dog, and a totalizer, the totalizer moving relatively to the master wheel and master dog; the totalizer containing for each decimal place thereof a set of parts composed of 1, an accumulating wheel, 2, a higher carrying wheel, 3, a lower carried wheel, and 4, epicyclic connection between the other three, 5, a locking dog to lock the accumulating wheel against rotation, and 6, means tending to hold said dog in locking position, the master wheel and master dog thus simultaneously engaging an accumulating wheel and locking dog, the thereupon motion of the master dog causing the retracting of the locking dog from the accumulating wheel, and the consequent unlocking of the latter, and the rotating of the master wheel causing movement only in that particular accumulating wheel which is in engagement therewith, the rest of the accumulating wheels remaining locked by their locking dogs.

6. In a calculating machine: the combination of a master wheel, a master dog, and a totalizer, the totalizer being movable relatively to said master wheel and master dog; the totalizer containing a series of sets of parts, one set for each decimal place thereof, each set containing therein 1, an accumulating wheel, and 2, a locking dog normally engaging said accumulating wheel to prevent the rotation thereof; the accumulating wheel being adapted to be engaged by the master wheel, and the locking dog for said accumulating wheel being adapted to be simultaneously engaged by the master dog.

7. In a calculating machine: the combination of a master wheel, a master dog, and a totalizer, the totalizer being movable relatively to said master wheel and master dog; the totalizer containing a series of sets, one set for each decimal place thereof, each set containing therein 1, an accumulating wheel, 2, a locking dog normally engaging said accumulating wheel to prevent the rotation thereof, and 3, a lever to operate said locking dog; the accumulating wheel being adapted to be engaged by the master wheel, and the locking dog for said accumulating wheel being adapted to be simultaneously engaged by the master dog.

8. In a calculating machine: the combination of a master wheel, a master dog, and a totalizer, the totalizer being movable relatively to said master wheel and master dog; the totalizer containing a series of sets of parts, one set for each decimal place thereof, each set containing 1, an accumulating wheel, 2, a locking dog normally engaging said wheel to prevent the rotation thereof, 3, a holding lever to operate said locking dog, the accumulating wheel being adapted to be engaged by the master wheel and the locking dog for said accumulating wheel being adapted to be simultaneously engaged by said master dog, and 4, a slot and pin connection between said holding lever and locking dog.

9. In a calculating machine: the combination of a master wheel, a master dog, and a totalizer, the totalizer being movable relatively to said master wheel and master dog; the totalizer containing a series of sets of parts, one set for each decimal place thereof, each set containing 1, an accumulating wheel, 2, a locking dog normally engaging said wheel to prevent the rotation thereof; 3, a holding lever to operate said locking dog, the accumulating wheel being adapted to be engaged by the master wheel, and the locking dog for said accumulating wheel being adapted to be simultaneously engaged by said master dog; a slot in said locking dog, said slot coöperating with a pin in said holding lever.

10. In a calculating machine: the combination of a master wheel, a master dog, and a totalizer, the totalizer being movable relatively to said master wheel and master dog;

the totalizer containing a series of sets of parts, one set for each decimal place thereof, each set containing 1, an accumulating wheel, 2, a locking dog normally engaging said wheel to prevent the rotation thereof, 3, a holding lever to operate said locking dog, the accumulating wheel being adapted to be engaged by the master wheel, and the lever for said accumulating wheel being adapted to be simultaneously engaged by said master dog; a slot in said locking dog, said slot coöperating with a pin in said holding lever; and a spring in said holding lever to keep it in normal position.

In witness whereof I have hereunto subscribed my name in the presence of two witnesses.

ARTHUR F. POOLE.

Witnesses:
E. W. STOLZENBACH,
O. R. HURLBUT.